April 19, 1955  N. B. MURPHY  2,706,548
DISCONNECT DEVICE
Filed July 24, 1946  2 Sheets-Sheet 1
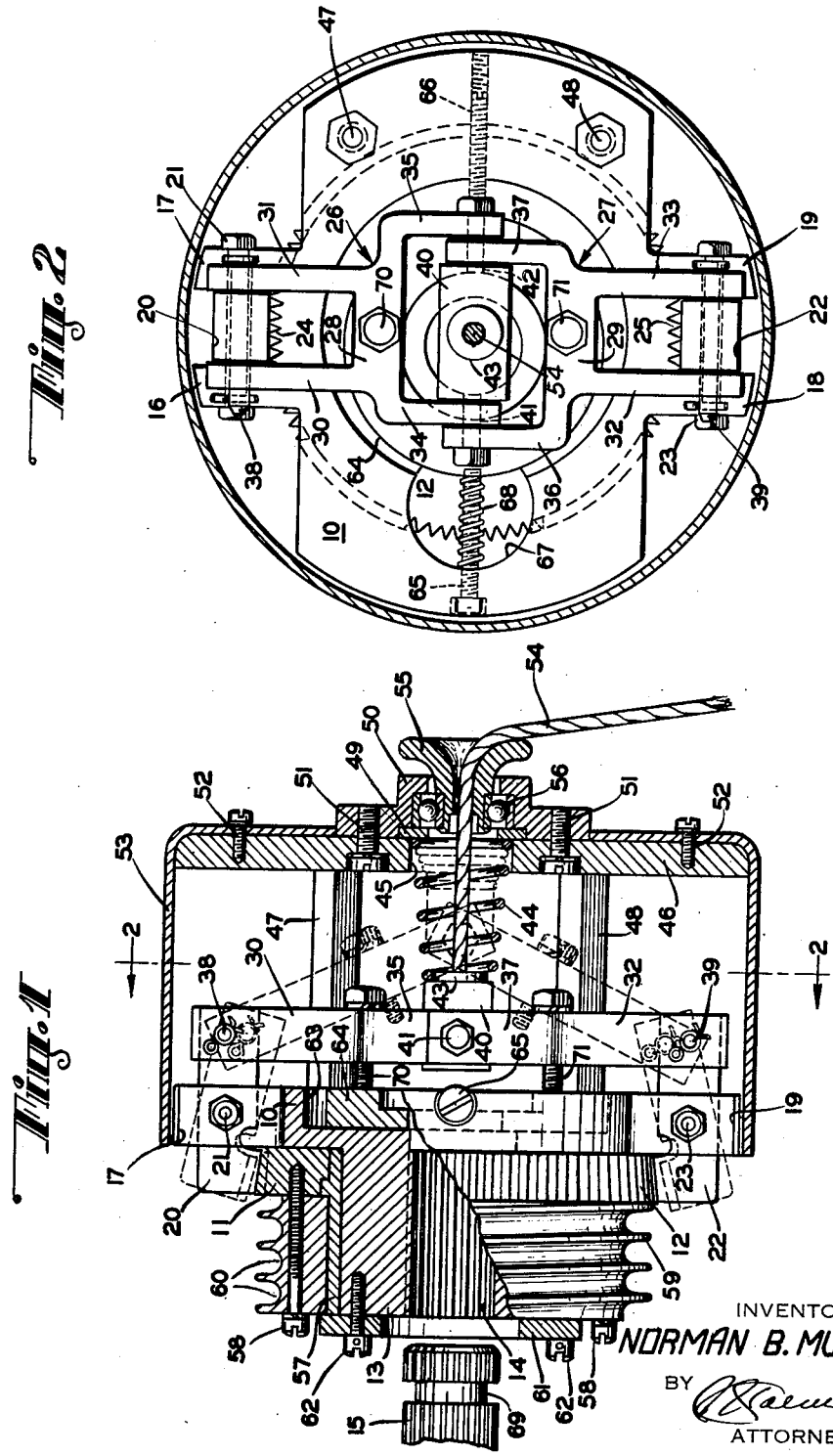
INVENTOR
NORMAN B. MURPHY
BY
ATTORNEY April 19, 1955 N. B. MURPHY 2,706,548
DISCONNECT DEVICE
Filed July 24, 1946 2 Sheets-Sheet 2
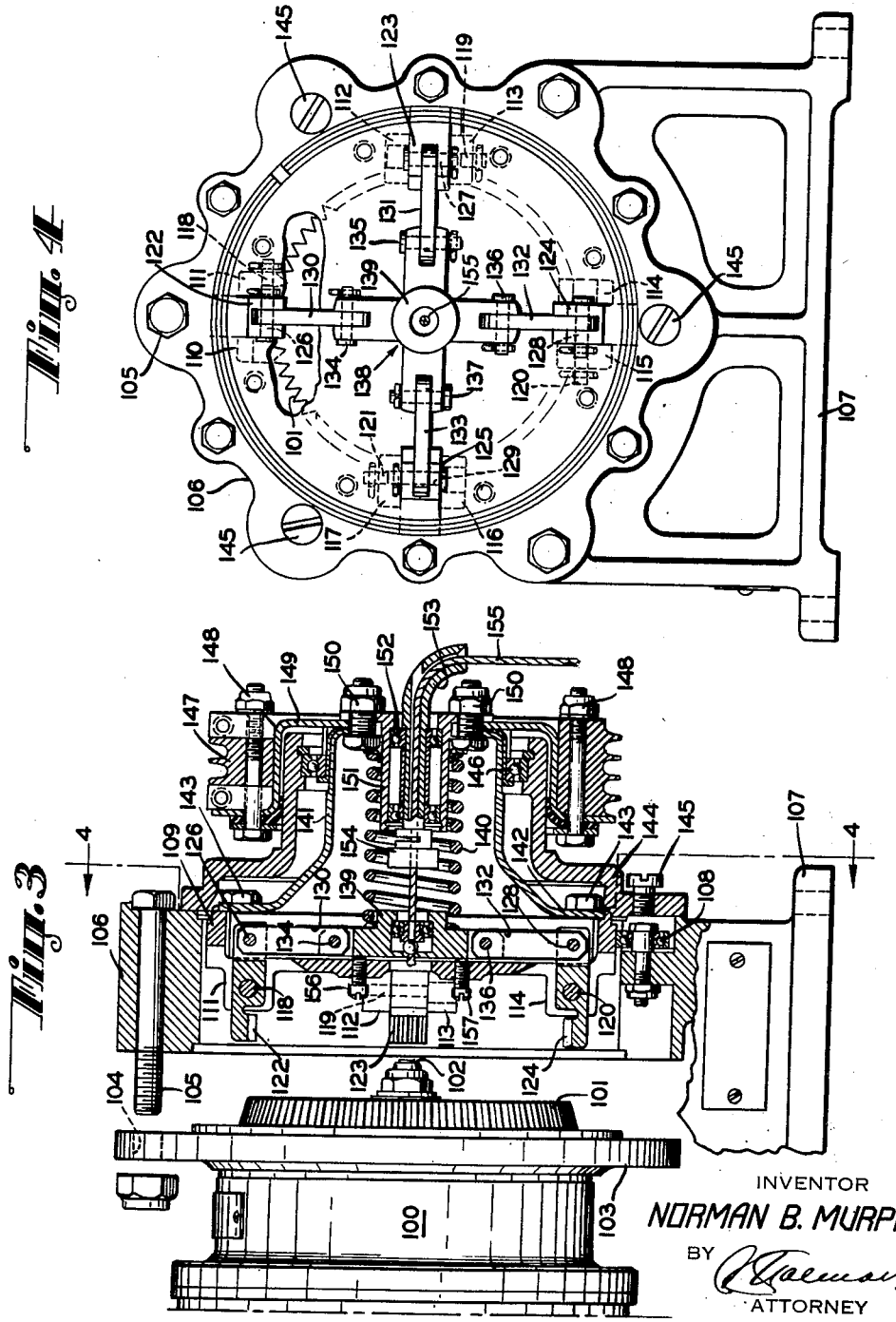
INVENTOR
NORMAN B. MURPHY
BY
ATTORNEY

United States Patent Office 2,706,548
Patented Apr. 19, 1955

2,706,548

DISCONNECT DEVICE

Norman B. Murphy, West Englewood, N. J., assignor to Bendix Aviation Corporation, Teterboro, N. J., a corporation of Delaware Application July 24, 1946, Serial No. 685,994

8 Claims. (Cl. 192—71)

This invention relates to disconnect apparatus generally and more particularly to remotely controlled disconnect and reconnect apparatus.

With the use of automatic steering systems on air or other craft it is desirable, especially in case of mechanical or other failure in the system, to immediately disconnect the system from the control surfaces so that the latter may be operated manually. It is equally desirable, while in flight and once the source of failure has been located and remedied, that the system may be reconnected to the control surfaces for re-establishing the automatic control thereof.

An object of the present invention, therefore, is to provide a novel and simple remotely operable reconnectable disconnect device.

Another object of the invention is to provide a novel and simple safety clutch for remotely connecting or disconnecting a driven member to or from a driving member.

Another object is to provide a device of the kind described which provides positive coupling between a driving member and a driven member and which does not release under driving forces.

Another object is to provide a plurality of elements on one of the members for engaging a clutching surface on the other member, and to control operation of the elements by a freely floating toggle so that the elements exert substantially equal pressure on the clutch surface.

A further object is to provide a novel reconnectable disconnect device for use in connection with an automatic steering system for aircraft, for example, whereby in response to manual control a remotely positioned cable carrying and operating servo pulley may be coupled to or de-coupled from a servomotor.

The above and further objects and novel features of the invention will appear more fully from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views:

Figure 1 is a side elevational view, partially in section, of the novel reconnectable disconnect device of the present invention;

Figure 2 is a sectional view taken substantially along line 2—2 of Figure 1;

Figure 3 is a side elevational view of a slightly modified form of the invention shown in Figure 1; and, Figure 4 is a sectional view taken substanitally along line 4—4 of Figure 3.

Referring now to the drawings and more particularly to Figures 1 and 2 thereof, for a more detailed description of the novel reconnectable disconnect device or safety clutch of the present invention, the latter is shown as generally comprising a driving member 10, and a driven member 11 which, in the present instance, is shown in the form of a ratchet wheel having a toothed periphery 12.

Driving member 10 is formed on one of its sides with a decreased central portion defining a hub 13 having a splined aperture 14 therethrough for the reception of a driving shaft 15, which may be the shaft of a servomotor (not shown). On its outer periphery, member 10 is provided at diametrically opposed points with two pairs of upstanding parallel spaced arms 16, 17 and 18, 19.

Arms 16, 17 pivotally support thereon a pawl 20 by way of a bolt 21 passing through the body of the pawl and both arms while arms 18, 19 pivotally support therein a pawl 22 by way of a bolt 23 passing through the pawl and both of the latter arms. Both pawls, moreover, are provided with toothed portions 24 and 25, which, under certain conditions, to be hereinafter more fully described, engage the toothed periphery 12 of driven member 11. If desired, bolts 21 and 23 may be formed eccentric to thereby provide an adjustment for both pawls toward or away from the ratchet wheel.

Pawls 20 and 22 are urged into engagement with ratchet 12 and out of engagement therewith by a toggle mechanism comprising a pair of toggle links generally designated with the reference characters 26 and 27. Each link may constitute a stamping having a cross-piece 28 and 29, each cross-piece supporting a pair of spaced outer arms 30, 31 and 32, 33, respectively, and a pair of spaced inner arms 34, 35 and 36, 37, respectively. Outer arms 30 and 31 of toggle link 26 pivotally connect by way of a pin 38 with the free end of pawl 20 and outer arms 32, 33 of link 27 pivotally connect by way of a pin 39 with the free end of pawl 22 while inner arms 34, 35 and 36, 37 of said links are pivotally connected with each other and with opposite ends of a bridge or yoke member 40 by way of pins 41, 42.

Yoke member 40 is provided with an apertured hub 43 which constitutes a retainer for one end of a relatively heavy spring 44, the opposite end of which is received within an aperture 45 of an annular plate 46, the latter being fastened to driving member 10 by way of spacer elements 47 and 48. A backing ring 49 arranged adjacent aperture 45 defines a stop for the spring, the ring being held in place by way of a hollow retainer member 50 which is fastened to plate 46 by way of screws 51. Also fastened to plate 46 by way of screws 52 is a cup-shaped housing 53 provided with a central opening for receiving retainer 50 therein.

One end of a suitable cable 54 is anchored within yoke member 40 and extends through spring 44 and a cable guide 55 to the pilot's compartment or some other desired location. One end of cable guide 55 is arranged within retainer 50 and provided between the two are suitable bearing members 56.

Yoke member 40 is free to move transversely to the axis of rotation of the driving and driven members to equalize the pressure exerted by the pawls on teeth 12 of the ratchet wheel when the mechanism is in driving position.

Ratchet wheel of driven member 11 is sleeved on a bushing 57 which, in turn, is loosely sleeved about hub 13 of driving member 10. Surrounding the bushing and fastened to member 11 by way of bolts 58 is a pulley 59 provided with peripheral grooves 60 for accommodating therein a cable (not shown) arranged between the pilot's or operator's manual control and the craft surface to be actuated. A ring 61, fastened to hub 13 by way of screws 62 acts as a retainer for maintaining driven member 11, bushing 57 and pulley 59 in an assembled condition.

In order to maintain a positive connection between motor shaft 15 and driving member 10, the inner side of the latter is formed with a recess 63 for accommodating a lock-washer 64 for transverse sliding motion therein. Washer 64 is provided with a threaded bore at its periphery for the reception of a bolt 65 which is carried in driving member 10 while a diametrically opposite point of the washer is engaged by a lock-screw 66. Driving member 10 is further provided with an opening 67, a stressed spring member 68 being arranged about bolt 65 and engaging at one of its ends with washer 64 and at its other end with the driving member at the inner periphery thereof defined by opening 67.

Once shaft 15 is inserted into splined bore 14, an annular recess 69 formed therein aligns itself with washer 64. For initial assembly, screw 66 is turned outwardly to an unlocked position and, thereafter, bolt 65 is adjusted causing washer 64 to move transversely of member 10 to engage recess 69 of the shaft, spring 68 assisting in such motion as bolt 65 is turned. Screw 66 is, thereafter, turned to a locked position to lock the washer in place and a novel locking expedient is provided thereby between shaft 15 and the driving member.

Cross-pieces 28 and 29 of toggle links 26 and 27 are provided with adjustable bolts 70 and 71 which engage with a face of washer 64 to provide an adjustable limit for the amount of inward motion of the toggle links resulting from the force exerted by spring 44 thereon. Bolts 70, 71 preferably are adjusted so that the toggle mechanism is at or just beyond straight-line position to lock the pawls in engagement with the ratchet wheel and prevent the pawls from releasing under load.

For a clearer understanding of the present invention, it may be assumed that no force is being exerted on cable 54 so that the various parts will assume the position designated in full lines in Figure 1, in which condition spring 44 has forced the toggle mechanism inwardly to provide engagement between pawls 20 and 22 and ratchet disc 11. This is the engaged position of the device, and operation of motor shaft 15 and driving member 10 is transmitted to driven member 11 and pulley 59 through the pawls and ratchet disc.

In the event of mechanical or other failure in the system it is desirable to disconnect the driving member from the driven member so that the latter may be operated manually. To effect the desired disengagement, the pilot or operator applies a force on the free end of cable 54 which results in outward motion of yoke member 40 which compresses spring 44 against backing plate 49. Motion of the yoke member carries toggle links 26 and 27 therewith whereby the latter move pawls 20 and 22 out of engagement with the ratchet wheel. In the latter condition, the ratchet wheel remains stationary even though driving member 10 may be roatting as a result of the rotation of shaft 15. The various parts of the device assume the dotted line position shown in Figure 1 when the driving and driven members have been disengaged. The toothed portion 12 of the driven member may be beveled as shown to prevent undesirable engagement with only a portion of the pawls with portion 12. In other words, by beveling the teeth of portion 12, engagement of the entire pawl length with portion 12 is instantly provided.

When the source of failure in the system has been located and remedied, the pilot or operator may re-establish, from a remote point, the drivable connection between the driving and driven members by simply releasing cable 54. Spring 44 snaps the toggle mechanism inwardly whereupon pawls 20 and 22 are forced into rapid engagement with the ratchet wheel. Some suitable expedient (not shown) may be provided for holding cable 54 to maintain the pawls out of engagement with the driven member to thereby relieve the pilot or operator of the necessity of maintaining a force on the cable.

A slightly modified form of the present invention is shown in Figures 3 and 4 wherein, for service and maintenance reasons, the driving motor may be readily removed from the remainder of the apparatus and instead of establishing a drivable connection between the driving and driven members at two points, as shown in Figures 1 and 2, the connection is established at four points spaced substantially ninety degree apart. To this end, the driving or servomotor 100 has a driving member, in the form of a toothed ratchet wheel 101 secured directly to its driving shaft by way of a bolt 102. The housing of the motor, moreover, is provided with an annular flange 103 having threaded apertures 104 (one only being shown in Figure 3) which accommodates bolts 105 therein for fastening the motor to a hollow cylindrical casing 106 secured to or formed integrally with a standard or bracket 107 which may be rigidly fastened to some part of the craft adjacent the surface that the motor is to control.

Rotatably mounted within casing 106 by way of suitable bearings 108 is an annular plate member 109 which supports on its inner face four pairs of spaced parallel arms 110, 111; 112, 113; 114, 115; and 116, 117, each pair of arms being spaced substantially ninety degrees with respect to the next pair of arms. Each pair of arms supports eccentric pins 118, 119, 120 and 121 for pivotally mounting therein pawls 122, 123, 124 and 125. The outer ends of the pawls are provided with toothed portions for engaging with driving ratchet wheel 101 in a manner to presently appear while the inner ends are pivotally connected through pins 126, 127, 128 and 129 with toggle links 130, 131, 132 and 133. The lower ends of the links are pivotally connected by way of pins 134, 135, 136 and 137 with a bridge or yoke member 138.

The bridge or yoke member is provided with four arms which merge in a common central raised annular hub 139 which constitutes a retainer for one end of a relatively heavy spring member 140, the opposite end of which bears against a centrally apertured cup-shaped member 141 having an outer flange 142 secured by means of screws 143 to plate member 109. Surrounding cup-shaped member 141 is a hollow cylindrical member 144 which is fastened to casing 106 by means such as screws 145 and arranged between members 141 and 144 are suitable bearings 146 for rotatably supporting member 141. A cable carrying pulley 147 is fastened by means of bolts 148 to a further cup-shaped member 149 which is secured by way of bolts 150 to member 141. Also clamped by bolts 150 to members 141 and 149 is a tubular member 151 which extends inwardly and supports therein on bearings 152 a cable guide 153 which is locked by means of a lock member 154 against longitudinal motion relative to the tubular member. A suitable cable 155 anchored at one end within bridge or yoke member 138 passes through spring 140 and cable guide 153 to the pilot's compartment.

Yoke member 138 may move transversely of the axis of rotation of the driving and driven members to equalize the pressure exerted by the pawls in engaging the ratchet wheel.

In order to adjust the amount of inward motion of the toggle mechanism, defined by toggle links 130, 131, 132 and 133, imposed thereon by spring member 140, adjustment bolts 156 and 157 are provided which are carried by plate member 109 with their free ends bearing against yoke member 138. Bolts 156, 157 preferably are adjusted so that the toggle mechanism is at or just beyond straight-line position to lock the pawls in engagement with the ratchet wheel and prevent the pawls from releasing under load.

Assuming motor 100 is fastened to casing 106, and with no force applied to operating cable 155, the device will be in an engaged position, i. e., one in which pawls 122, 123, 124 and 125 will be drivably engaged with ratchet wheel 101, the teeth of which are beveled, as shown, to provide instantaneous engagement or tangent engagement of the entire pawl length with the teeth of the driving member. Assuming, further, that motor 100 is running, the operation thereof is transmitted to cable bearing pulley 147 through ratchet wheel 101, pawls 122, 123, 124 and 125 and the toggle mechanism to plate member 109. Rotation of the latter member results in rotation of members 141 and 149 and since pulley 147 is fastened to the latter it rotates therewith.

To discontinue the driving connection between the driving and driven members and thus disconnect the cable bearing pulley from the control of the motor, the pilot or operator applies a pull on cable 155 sufficient to move yoke member 138 to the right (Figure 3) to compress spring 140. Such motion on the part of the yoke member moves toggle links 130, 131, 132 and 133 outwardly to pivot pawls 122, 123, 124 and 125 upwardly away from the driving member or ratchet wheel 101.

To re-establish, on the other hand, the drivable connection between the driving and driven members, cable 155 is released and spring member 140 immediately expands to urge the toggle mechanism inwardly to move pawls 122, 123, 124 and 125 downwardly into engagement with ratchet disc 101 whereby a positive driving connection is rapidly obtained.

There has thus been provided a novel and desirable reconnectable disconnect device or safety clutch which is operable remotely to rapidly and positively provide a drivable connection between a driving and driven member and which is operable to terminate the driving connection at will.

Although two embodiments of the present invention have been illustrated and described in detail, it is to be expressly understood that the invention is not limited thereto. Various changes may be made in the design and arrangement of the parts without departing from the spirit and scope of the invention as the same will be now understood by those skilled in the art. For a definition of the limits of the invention reference is, therefore, to be had to the appended claims.

What is claimed is:

1. A reconnectable disconnect device comprising a casing, a driven member rotatably mounted within said casing, means comprising a driving member secured to said casing and having a clutching surface thereon, a plurality of pawls pivotally mounted on said driven member and adapted for movement in one direction to engage said clutching surface and in an opposite direction to disengage said surface, a toggle mechanism connected to said pawls, a resilient member arranged between said mechanism and said casing for moving said mechanism toward said driven member to actuate said pawls into engagement with said surface, means for adjustably setting the mount of movement of said mechanism toward said driven member, and means including a cable fastened to said mechanism for moving the latter away from said driven member to actuate said pawls out of engagement with said surface.

2. In combination, a driving member, a driven member, a clutching surface on one of said members, a pair of elements on the other of said members movable into engagement with said surface to provide a driving connection between said members and movable out of engagement with said surface to provide for relative rotation of said members, said elements engaging said surface at diametrically opposed points, and a toggle mechanism for moving said elements into engagement with said surface, said toggle mechanism being movable transversely to the axis of rotation of said members to equalize the pressure exerted by said elements on said surface.

3. In a device of the kind described, a driving member, a driven member, a clutching surface on one of said members, a pair of elements on the other of said members movable into engagement with said surface to provide a driving connection between said members and movable out of engagement with said surface to provide for relative rotation of said members, a toggle mechanism for moving said elements into engagement with said surface, said toggle mechanism being movable transversely to the axis of rotation of said members to equalize the pressure exerted by said elements on said surface, and yielding means acting on said toggle mechanism and urging said elements into engagement with said surface.

4. In a remotely operable safety clutch for connecting and disconnecting a driven member to and from a driving member, a toothed element on one of said members, a pair of pawls mounted on the other of said members and movable into engagement with the teeth of said element to provide a driving connection between the members and for movement out of engagement with the teeth of said element to provide for relative rotation of said members, and a toggle mechanism for moving said pawls into engagement with the teeth of said element, said toggle mechanism being movable transversely to the axis of rotation of said members to equalize the pressure exerted by said pawls on the teeth of said element.

5. In a device of the kind described, a driving member, a driven member, an annular clutching surface on one of said members, two pairs of elements on the other of said members movable into engagement with said surface to provide a driving connection between said members and movable out of engagement with said surface to provide for relative rotation of said members, said elements engaging said surface at spaced points substantially equi-distant from one another and each pair of elements engaging said surface at diametrically opposed points, and a toggle mechanism for moving said elements into engagement with said surface, said toggle mechanism being movable transversely to the axis of rotation of said members to equalize the pressure exerted by pairs of diametrically opposed elements on said surface.

6. In a device of the kind described, a driving member, a driven member, a clutching surface on one of said members, a plurality of elements on the other of said members movable into engagement with said surface to provide a driving connection between said members and movable out of engagement with said surface to provide for relative rotation of said members, a toggle mechanism including an actuator linked pivotally to said elements, said actuator being movable in one direction for moving said elements into engagement with said surface, whereby when said actuator is moved in said one direction, said actuator holds said elements and said surface in engagement, and adjustable means for limiting the amount of movement of said toggle mechanism in said one direction whereby said adjustable means controls the amount of external force required to release the force of said actuator holding the elements and surface in engagement.

7. In a device of the kind described, a driving member, a driven member, a clutching surface on one of said members, a plurality of elements on the other of said members movable into engagement with said surface to provide a driving connection between said members and movable out of engagement with said surface to provide for relative rotation of said members, a toggle mechanism movable in one direction for moving said elements into engagement with said surface, resilient means acting on said toggle mechanism and urging said elements into engagement with said surface, and adjustable means for limiting movement of said toggle mechanism in said one direction.

8. In a device of the kind described, a driving member, a driven member, a clutching surface on one of said members, a plurality of elements on the other of said members movable into engagement with said surface to provide a driving connection between said members and movable out of engagement with said surface to provide for relative rotation of said members, a toggle mechanism movable in one direction to move said elements into engagement with said surface, said toggle mechanism being movable transversely to the axis of rotation of said members to equalize the pressure exerted by said elements on said surface, and adjustable means for limiting movement of said toggle mechanism in said one direction.

References Cited in the file of this patent

UNITED STATES PATENTS

| Number | Name | Date |
|---|---|---|
| 452,225 | Kalback | May 12, 1891 |
| 539,242 | Thompson | May 14, 1895 |
| 595,556 | Buffum | Dec. 14, 1897 |
| 638,637 | La Clair | Dec. 5, 1899 |
| 785,887 | Jacobson | Mar. 28, 1905 |
| 813,869 | Deiller | Feb. 27, 1906 |
| 917,603 | Hench | Apr. 6, 1909 |
| 1,046,995 | Deiller | Dec. 10, 1912 |
| 1,412,606 | Botts | Apr. 11, 1922 |
| 1,438,073 | Wicks | Dec. 5, 1922 |
| 1,486,680 | Peter | Mar. 11, 1924 |
| 1,517,189 | Brownback | Nov. 25, 1924 |
| 1,608,143 | Stevenson | Nov. 23, 1926 |
| 1,946,062 | Cramp | Feb. 6, 1934 |
| 2,190,447 | Frazier | Feb. 13, 1940 |
| 2,208,807 | Weiher | July 23, 1940 |
| 2,391,333 | Nardone | Dec. 18, 1945 |
| 2,392,381 | Hanson et al. | Jan. 8, 1946 |
| 2,426,505 | Hill | Aug. 26, 1947 |
| 2,429,425 | Nardone | Oct. 21, 1947 |

FOREIGN PATENTS

| 545,994 | Germany | Mar. 8, 1932 |